(12) United States Patent
Ulrich

(10) Patent No.: US 12,147,951 B2
(45) Date of Patent: *Nov. 19, 2024

(54) SYSTEMS AND METHODS FOR SECOND TAP E-RECEIPT OPTION FOR NFC-ENABLED PAYMENT VEHICLES

(71) Applicant: Worldpay, LLC, Symmes Township, OH (US)

(72) Inventor: Chance Ulrich, Milton, GA (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,321

(22) Filed: Aug. 30, 2023

(65) Prior Publication Data

US 2023/0401546 A1 Dec. 14, 2023

Related U.S. Application Data

(63) Continuation of application No. 17/402,901, filed on Aug. 16, 2021, now Pat. No. 11,775,944, which is a continuation of application No. 16/600,223, filed on Oct. 11, 2019, now Pat. No. 11,120,412, which is a continuation of application No. 15/333,900, filed on Oct. 25, 2016, now Pat. No. 10,475,005.

(51) Int. Cl.
*G06Q 20/06* (2012.01)
*G06Q 20/04* (2012.01)
*G06Q 20/20* (2012.01)
*G06Q 20/32* (2012.01)
*G06Q 20/08* (2012.01)

(52) U.S. Cl.
CPC ......... *G06Q 20/047* (2020.05); *G06Q 20/202* (2013.01); *G06Q 20/204* (2013.01); *G06Q 20/3278* (2013.01)

(58) Field of Classification Search
CPC .. G06Q 20/047; G06Q 20/202; G06Q 20/204; G06Q 20/3278; G06Q 20/209; G06Q 20/326; G06Q 20/387
USPC .......................................................... 705/17
See application file for complete search history.

(56) References Cited

U.S. PATENT DOCUMENTS

| 9,760,871 B1 * | 9/2017 | Pourfallah | G06Q 20/405 |
| 2014/0040052 A1 * | 2/2014 | Arthur | G06Q 20/322 |
| | | | 705/16 |
| 2018/0075446 A1 * | 3/2018 | Yin | G06Q 20/3278 |

* cited by examiner

*Primary Examiner* — Garcia Ade
(74) *Attorney, Agent, or Firm* — Bookoff McAndrews, PLLC

(57) ABSTRACT

Systems and methods are disclosed for generating electronic receipts (e-receipts) at point-of-sale (POS) terminals associated with a merchant at a retail location. The systems and methods include a near field communication (NFC) reader and an NFC-enabled payment vehicle. A POS terminal processes a payment transaction after an initial interaction between the NFC reader and the NFC-enabled payment vehicle. An e-receipt is generated when a second interaction is detected between the NFC reader and the NFC-enabled payment vehicle.

20 Claims, 7 Drawing Sheets

SYSTEMS AND METHODS FOR SECOND TAP E-RECEIPT OPTION FOR NFC-ENABLED PAYMENT VEHICLES

CROSS-REFERENCE TO RELATED APPLICATION(S)

This patent application is a continuation of and claims the benefit of priority to U.S. application Ser. No. 17/402,901, filed on Aug. 16, 2021, which is a continuation of U.S. application Ser. No. 16/600,223, filed on Oct. 11, 2019, now U.S. Pat. No. 11,120,412, which is a continuation of U.S. application Ser. No. 15/333,900, filed on Oct. 25, 2016, now U.S. Pat. No. 10,475,005, the entireties of which are incorporated herein by reference.

TECHNICAL FIELD

The present disclosure relates generally to the field of payment transactions and, more particularly, to the generation of electronic receipts at point of sale (POS) terminals.

BACKGROUND

Merchants and other store owners have point of sale (POS) terminals and POS systems that accept check or payment card payments from consumers for goods and services. Brick-and-mortar merchants, in particular, generate paper receipts when finalizing payment transactions for consumers. Merchants consequently incur increased operating costs when having to print paper receipts for every payment transaction.

SUMMARY

A computer-implemented method is disclosed for managing electronic payment transactions at a merchant location. The method comprises initiating a check-out procedure for a consumer to complete a payment transaction at a point-of-sale (POS) terminal associated with a merchant; prompting the consumer to present a payment vehicle and interact with the POS terminal for completing the payment transaction; receiving an indication that an NFC-enabled payment vehicle interacted with the POS terminal; receiving customer data from the NFC-enabled payment vehicle; processing the payment transaction with the received customer data; receiving an indication that the NFC-enabled payment vehicle interacted a second time with the POS terminal; generating an e-receipt as a result of the second NFC interaction, the e-receipt comprising customizable features including consumer incentive features, interactive coupons, and/or loyalty rewards for the consumer; and transmitting the e-receipt to the NFC-enabled payment vehicle for display on the NFC-enabled payment vehicle.

A system is disclosed for managing electronic payment transactions at a merchant location, the system comprising: a data storage device storing instructions for managing electronic payment transactions at a merchant location; and a processor configured to execute the instructions to perform a method including the steps of: initiating a check-out procedure for a consumer to complete a payment transaction at a point-of-sale (POS) terminal associated with a merchant; prompting the consumer to present a payment vehicle and interact with the POS terminal for completing the payment transaction; receiving an indication that an NFC-enabled payment vehicle interacted with the POS terminal; receiving customer data from the NFC-enabled payment vehicle; processing the payment transaction with the received customer data; receiving an indication that the NFC-enabled payment vehicle interacted a second time with the POS terminal; generating an e-receipt as a result of the second NFC interaction, the e-receipt comprising customizable features including consumer incentive features, interactive coupons, and/or loyalty rewards for the consumer; and transmitting the e-receipt to the NFC-enabled payment vehicle for display on the NFC-enabled payment vehicle.

A non-transitory computer readable medium is disclosed for use on at least one computer system containing computer-executable programming instructions for managing electronic payment transactions at a merchant location, the method comprising: initiating a check-out procedure for a consumer to complete a payment transaction at a point-of-sale (POS) terminal associated with a merchant; prompting the consumer to present a payment vehicle and interact with the POS terminal for completing the payment transaction; receiving an indication that an NFC-enabled payment vehicle interacted with the POS terminal; receiving customer data from the NFC-enabled payment vehicle; processing the payment transaction with the received customer data; receiving an indication that the NFC-enabled payment vehicle interacted a second time with the POS terminal; generating an e-receipt as a result of the second NFC interaction, the e-receipt comprising customizable features including consumer incentive features, interactive coupons, and/or loyalty rewards for the consumer; and transmitting the e-receipt to the NFC-enabled payment vehicle for display on the NFC-enabled payment vehicle.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Figure 1:
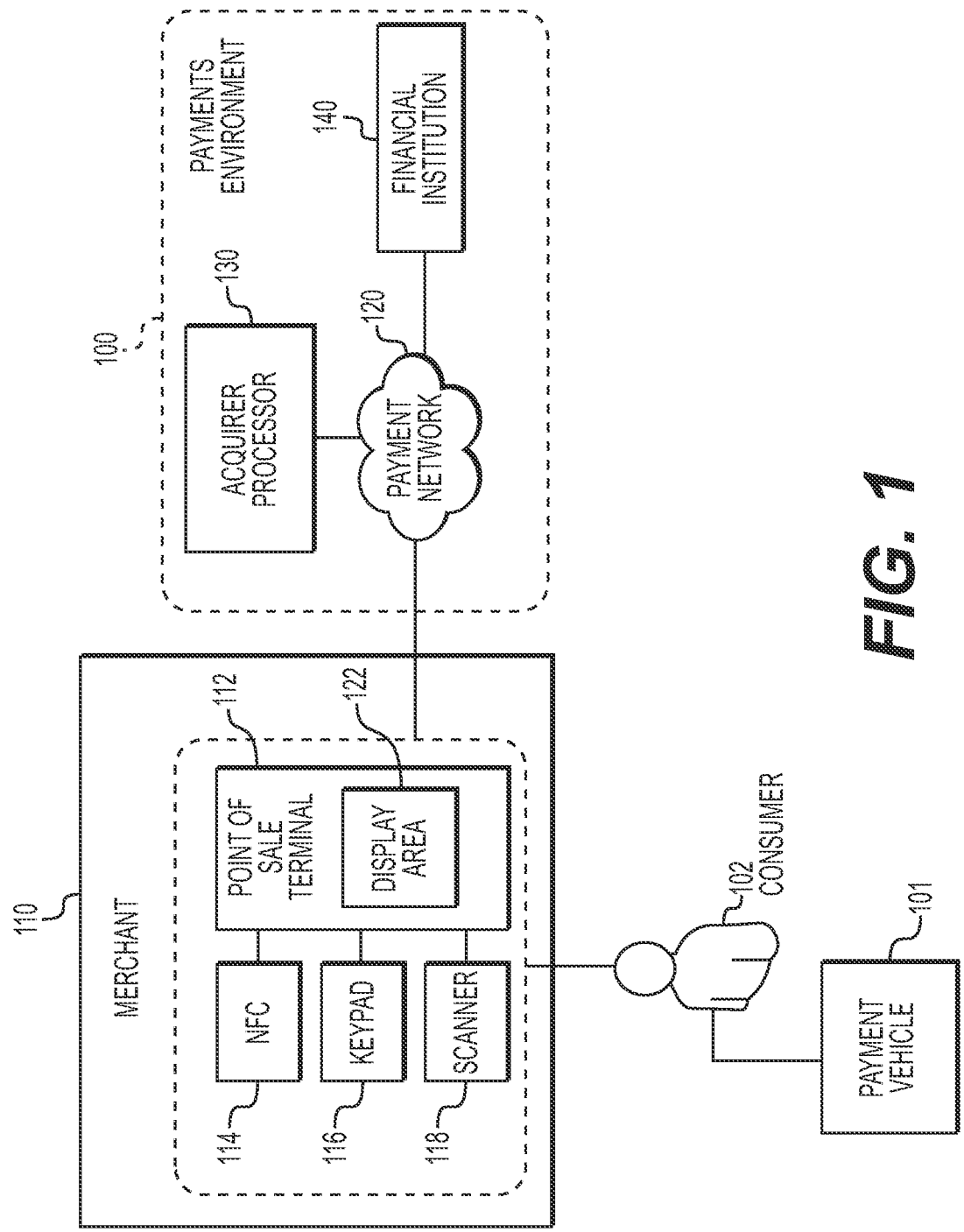
FIG. 1 depicts a merchant environment for processing consumer payment transactions, according to one or more embodiments.

Various non-limiting embodiments of the present disclosure will now be described to provide an overall understanding of the principles of the structure, function, and use of systems and methods disclosed herein related to the generation of electronic receipts (e-receipts). One or more examples of these non-limiting embodiments are illustrated in the selected examples disclosed and described in detail with reference made to FIGS. 1 through 7 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting environments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. either are related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack.

As described above, a merchant may incur increased operation costs when having to print paper receipts for every purchase transaction. Thus, the embodiments of the present disclosure are directed to reducing operating costs for merchants by providing consumers with the option to receive an electronic receipt (e-receipt) at the time of purchase. Furthermore, embodiments may provide for the customization of e-receipts for providing incentive features to benefit both merchants and consumers.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, or any other like financial transaction instrument.

Point-of-sale ("POS") systems used by merchants generally accept payments from consumers in the form of cash, check, credit cards and so forth. POS systems can include one or more POS terminals and can include back-office computing systems. POS systems and POS terminals can be specialized computing devices configured to send and receive financial transaction data, for example between a POS system and a POS terminal, or with a payment network provider such as an acquirer processor. Acquirer processors similarly can use specialized computing devices configured to send, receive, and process financial transaction data.

FIG. 1 depicts a payments processing network generally comprising a merchant 110, acquirer processor 130, financial institution 140, and consumer 102, all provided in communication with each other via a payment network 120. The components of the payments processing network may be connected by any combination of wired or wireless networks, for example, PSTNs and/or the Internet. Acquirer processor 130 (e.g., acquiring bank) is in partnership with payment network 120, such that the acquirer processor 130 may process payments through, and on behalf of, payment network 120. Payment network 120 may in turn have a partnership with financial institution 140 (e.g., issuing bank). Financial institution 140 may hold accounts for one or more of consumer 102. Consumer 102 may have a payment vehicle 101 (e.g., credit card, debit card, stored value card, etc.) which may be affiliated with payment network 120. Consumer 102 may be able to use their payment vehicle 101 for purchases from merchant 110.

Acquirer processor 130 may be an entity that provides a variety of electronic payment processing services to merchant 110. For example, acquirer processor 130 may be an entity that receives payment information from a transaction that occurs at a POS terminal 112 at merchant 110. The payment information may be, for example, payment card information encoded in the magnetic stripe or EMV chip of payment vehicle 101 and a payment amount of a transaction being made by, for example, consumer 102 with merchant 110 using the payment card account associated with payment vehicle 101. Acquirer processor 130 may process the information, and may send the information to the consumer's respective financial institution 140 via an appropriate payment network 120 depending on the particulars of payment vehicle 101. Processing the information may include, for example, determining the identity of payment network 120 and financial institution 140 associated with the particular payment vehicle 101.

Acquirer processor 130 may also receive information from payment network 120 such as confirmation or rejection of an attempted transaction using payment vehicle 101 and may convey that information to the appropriate POS terminal. Moreover, acquirer processor 130 may provide security and/or encryption services to merchant 110 and payment network 120; such that payments processed at POS terminal 112 may be completed with a decreased risk of data or financial theft or loss. Acquirer processor 130 may be located, for example, remotely from merchant 110 that use its services, and may, for example, interact with merchant 110 primarily over an electronic network, such as a data network or the Internet.

Payment network 120 may be, for example, a network that relays debit and/or credit transactions to and from various accounts at financial institution 140. For example, payment network 120 may have a partnership program with financial institution 140 through which financial institution 140 may provide a payment vehicle account to consumer 102 associated with payment network 120. Payment network 120 may also be partnered with acquirer processor 130 which may manage payment transactions associated with payment network 120. Examples of payment network brands include, e.g., Visa, MasterCard, Discover, and American Express. While a single payment network 120 is illustrated, it is to be appreciated that multiple payment networks may be partnered with a single or multiple acquirer processors.

Financial institution 140 may be a bank that manages payment accounts associated with one or more of payment network 120 on behalf of one or more of consumer 102. For example, financial institution 140 may allow for consumer 102 to build up a revolving credit balance at financial institution 140 and may periodically receive payments from consumer 102 to pay down the balance. Consumer 102 may be an individual, a company, or other entity having accounts with one or more of financial institution 140. Each consumer 102 may generally have at least one payment vehicle 101 associated with each payment account held by that consumer. Each consumer 102 may have multiple accounts with multiple financial institutions 140 which may be affiliated with the same or different payment network 120.

Merchant 110 may be a merchant offering goods and/or services for sale to consumer 102 who have contracted with acquirer processor 130. Merchant 110 may be equipped with POS terminal 112, which is configured to receive payment information from payment vehicle 101 and to relay received payment information to acquirer processor 130. Merchant 110 can be any type of merchant, such as a brick-and-mortar retail location or an e-commerce/web-based merchant with a POS terminal 112.

New payment modalities for purchasing goods and services enable consumer 102 to pay using forms of payment other than cash, check, or payment card. For example, online vendors accept payments via third-party payment providers, but can be termed third-party payment processors. Example third-party payment providers include, but are not limited to ApplePay™, Android Pay™, PayPal™, and Samsung Pay™ among other suitable third-party payment providers. Consumers 102 can pay for goods and services using their mobile computing device, such as an iPhone™ from Apple™, or an Android™ based smartphone. These new payment types can be beneficial to consumer 102 and merchant 110 alike. Consumer 102 can benefit from the convenience of using mobile payment systems. Merchant 110 can benefit from more economical transaction costs offered by third-party payment providers. Many third-party payment providers use digital wallets. Digital wallets provide flexibility to consumer 102, allowing consumer 102 to choose their preferred form of payment from one or more accounts configured in their digital wallet. For example, for any transaction, consumer 102 can choose whether to pay from a payment card, bank account, or line of credit in their digital wallet. Digital wallets also provide security to consumer 102 because the consumer's payment card and bank account numbers are not provided to a merchant 110 during checkout.

In FIG. 1, consumer 102 is shown to be associated with a payment vehicle 101. As is to be appreciated, payment vehicle 101 can include any type of payment vehicle that can be utilized to initiate a payment transaction. Unless otherwise specified herein, "payment vehicle" includes a virtual card, such as a display or screenshot for a mobile phone or for another portable device (e.g., a flash drive, smart chip, a laptop or portable computer), or for a computer device (e.g., a desktop computer) in combination with data indicative of an account number or other account indicative information. Data associated with the cards may include an encrypted or unencrypted account number or other encrypted or unencrypted account indicative information and/or encrypted or unencrypted information associated with a particular card, issuer, creator, or group of merchants. It is also contemplated that the card may have multiple embodiments or forms. For example, the card may be a physical card (e.g., in the form of magnetic striped plastic card), a virtual card (e.g., in the form of a display on a smart phone), or both. In embodiments in which the card is a virtual card, the corresponding account information (e.g., account number) would initially be provided to the consumer and the consumer would communicate the account information to the merchant. The virtual card may be communicated by displaying a display or screenshot, and/or by transmitting a signal, such as by using a near field communication (NFC) technology, or other secure transport technologies to complete the transaction with the selected merchant. NFC is a short range, high frequency, wireless communication technology that enables the exchange of data between devices over a relatively short distance. Optionally, the virtual card may have a display element (e.g., a barcode or string of numbers) which identifies the account number associated with the card. Alternatively, the virtual card may have display elements relating to the merchants which accept the card. Thus, whether the card is physical or virtual, it communicates account information.

A POS terminal 112 of merchant 110 provides transaction information to the payment network 120 using conventional payment transaction communications. When consumer 102 checks-out, or pays for the goods or services, the identifying indicia of consumer 102 can be used for authentication. In one configuration, the POS terminal 112 can include an NFC system 114. NFC system 114 can communicate wirelessly with payment vehicle 101 of consumer 102, for example to obtain an authorization code or identifying information of consumer 102 or of payment vehicle 101. In another configuration, POS terminal 112 can include a keypad 116. Consumer 102 can enter a personal identification number on keypad 116 for making a payment. Other numbers or alphanumeric characters, such as temporary passwords or authorization codes, are also contemplated as would be understood by one of ordinary skill in the art. In another configuration, POS terminal 112 can include a scanner 118. Consumer 102 can display a code, such as a barcode or quick response (QR) code on the display of their mobile computing device to provide identifying indicia of consumer 102. Scanner 118 can be a handheld scanner, an embedded scanner such as is used to scan items at grocery stores, a camera, and so forth as would be understood by one of ordinary skill in the art.

POS terminal 112 can include a display area 122. In various embodiments the display area 122 can be a window, a widget, or a pop-up, a webpage, and so forth, and be rectangular or nonrectangular, and occupy one or multiple contiguous or non-contiguous areas of POS terminal 112.

POS terminal 112 can generate a payment request for payment by merchant 110. The payment request can include information such as information identifying the merchant to acquirer processor 130 or the party of payment network 120, the payment amount, which can include a gratuity, identifying indicia for consumer 102, authentication information such as whether the consumer was authenticated by merchant 110 using images of consumer 102, and/or authentication information such as personal identification number entered on keypad 116 by the consumer, a code scanned by scanner 118, or information about consumer 102 or payment vehicle received via NFC handshake or any other suitable authentication information.

The payment request can be packaged into a data structure and sent to the acquirer processor 130 or other transaction processing entity in the payment network 120 for processing. Suitable data structures can include, but are not limited to, proprietary data structures, or data structures to find a suitable notation such as Abstract Syntax Notation One (ASN.1) or Java Script Object Notation (JSON), or any other suitable encoding formats or data structure as would be understood by one of ordinary skill in the art. In various embodiments, a mobile wallet service can be used or a third party payment provider's digital wallet can be accessed. Consumer 102 can configure the digital wallet to use the desired bank account, payment card, or line of credit to be used in processing the transaction. Acquirer processor 130 can process the transaction with financial institution 140, and POS terminal 112 can receive confirmation of a successful transaction from payment network 120. If not successful, POS terminal 112 can receive information indicating why payment was not able to be made through financial institution 140. The transaction result can be displayed to consumer 102 via any suitable method, including via display area 122 of POS terminal 112.

Figure 2B:
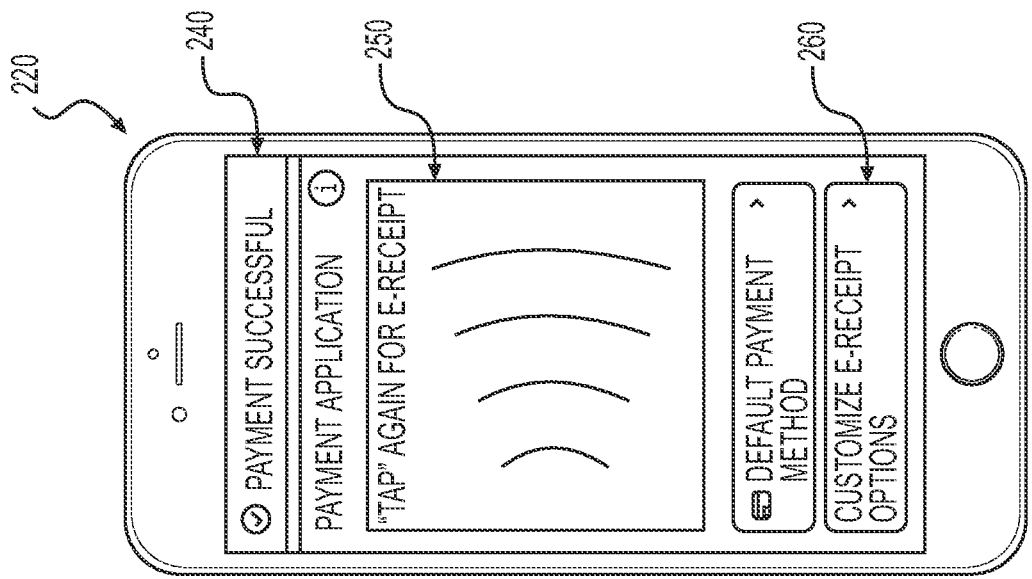
FIG. 2B depicts an illustrative display of an NFC-enabled payment vehicle after a successful payment transaction, according to one or more embodiments.
Figure 2A:
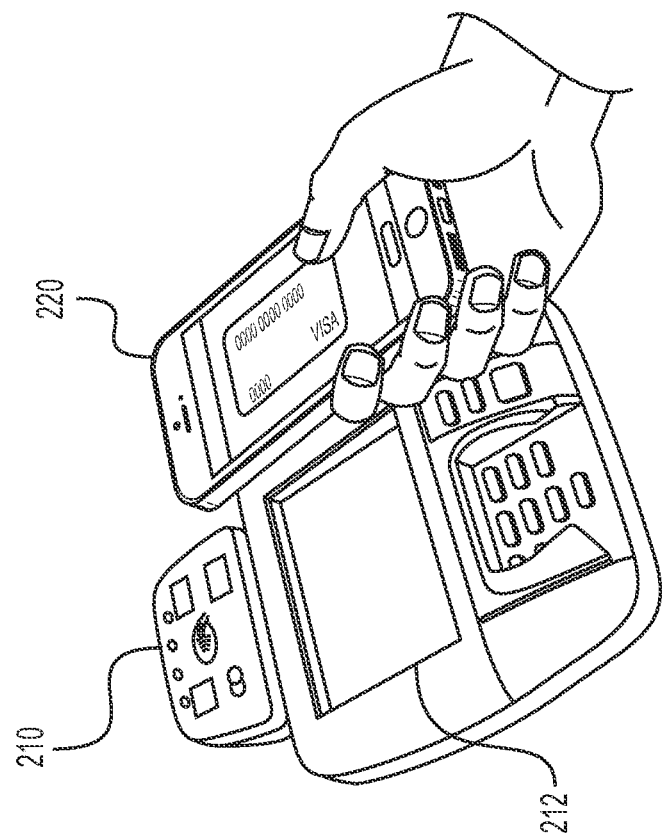
FIG. 2A depicts an NFC-enabled payment vehicle interacting with an NFC device during a payment transaction, according to one or more embodiments.

FIGS. 2A-2B illustrate embodiments of an example system and method for facilitating a check-out procedure. FIG. 2A depicts an interaction between an NFC-enabled payment vehicle 220 and an NFC device 210 for facilitating a payment transaction during a check-out procedure. In some embodiments, NFC device 210 includes a display 212 for displaying or prompting messages to consumer 102. During a check-out procedure, the consumer is prompted to "tap" the NFC-enabled payment vehicle 220 for initiating a payment transaction. The term "tap" can be any kind of motion (e.g., waving or holding in close proximity) in which the NFC device 210 registers interaction (e.g., handshake) with the NFC-enabled payment vehicle 220. After initiating the payment transaction, the payments environment 100 processes whether the payment transaction is successful.

FIG. 2B depicts an illustrative display of an NFC-enabled payment vehicle 220 after a successful purchase transaction. In some embodiments, the consumer's NFC-enabled payment vehicle 220 includes a plurality of indicators and selection areas for consumer 102. For example, indicator 240 communicates to consumer 102 the result of the payment transaction. Indicator 250 prompts consumer 102 to "tap" the NFC-enabled payment vehicle 220 a second time to retrieve an electronic receipt (e.g., e-receipt). While indicator 240 illustrates a successful payment transaction, it is to be appreciated that consumer 102 can be prompted to receive an electronic receipt even if a transaction is declined. Selection area 260 enables consumer 102 to customize other features or options to be displayed when an e-receipt is generated. The customizable features will be described later with reference to FIGS. 6A-6B.

Figure 3:
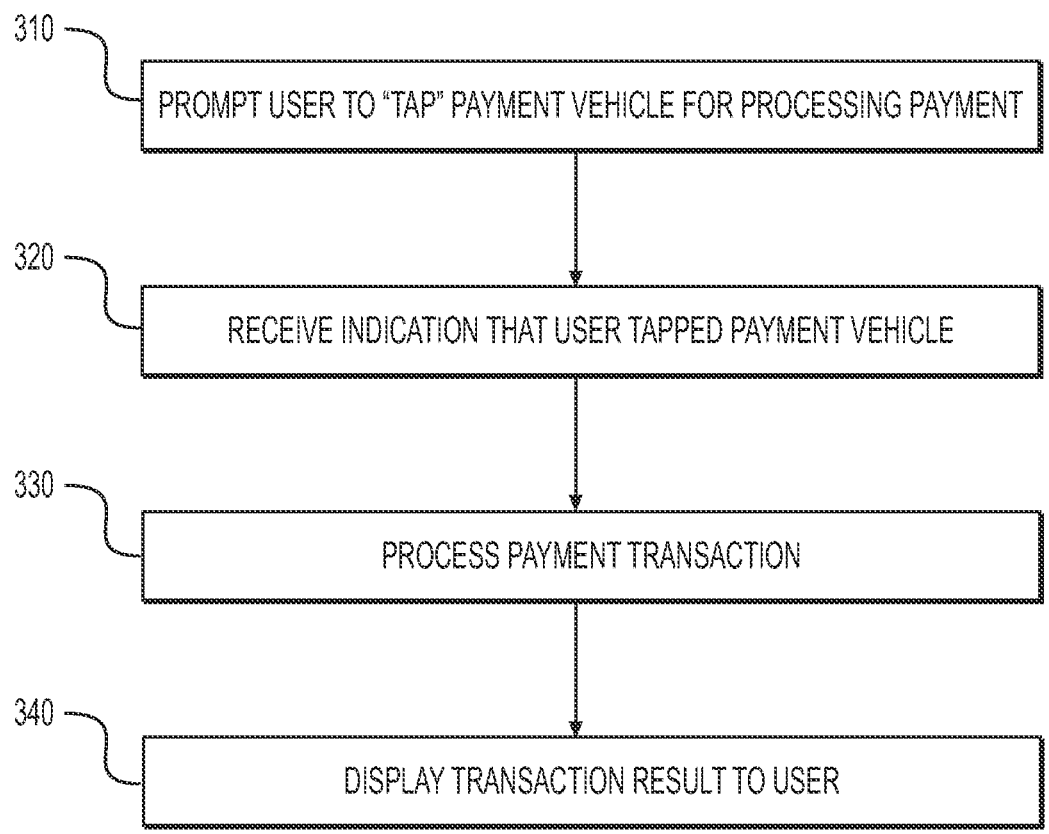
FIG. 3 is a flow chart of an example process of a payment transaction initiated between an NFC device and an NFC-enabled payment vehicle, according to one or more embodiments.

FIG. 3 is a flow chart depicting an example process 300 for prompting a consumer to "tap" the NFC-enabled payment vehicle to initiate a payment transaction. In step 310, consumer 102 is prompted to "tap" the NFC-enabled payment vehicle 220 to interact with NFC device 210. In some embodiments, the prompting message can be communicated to consumer 102 via display area 122 of POS terminal 112. In other embodiments, the prompting message can be communicated via display 212 of NFC device 210. In step 320, the POS terminal 112 receives indication that the NFC-enabled payment vehicle 220 interacted with the NFC device. In step 330, POS terminal 112 processes the payment transaction by receiving consumer payment data from the NFC-enabled payment vehicle 220 and sending the consumer payment data to payment network 120. Payment network 120 can generally process payment transactions either online or offline. In some embodiments, offline approvals may be processed at POS terminal 112 before sending the transaction information to payment network 120 (e.g., delayed processing). In other embodiments, an offline transaction may be processed at POS terminal 112 and declined without sending the transaction information to payment network 120. In step 340, POS terminal 112 receives the result of the payment transaction and displays the result. The result of the payment transaction can be displayed on display area 122 of POS terminal 112, display 212 of NFC device 210, and/or on indicator 240 of the NFC-enabled payment vehicle 220.

Figure 4B:
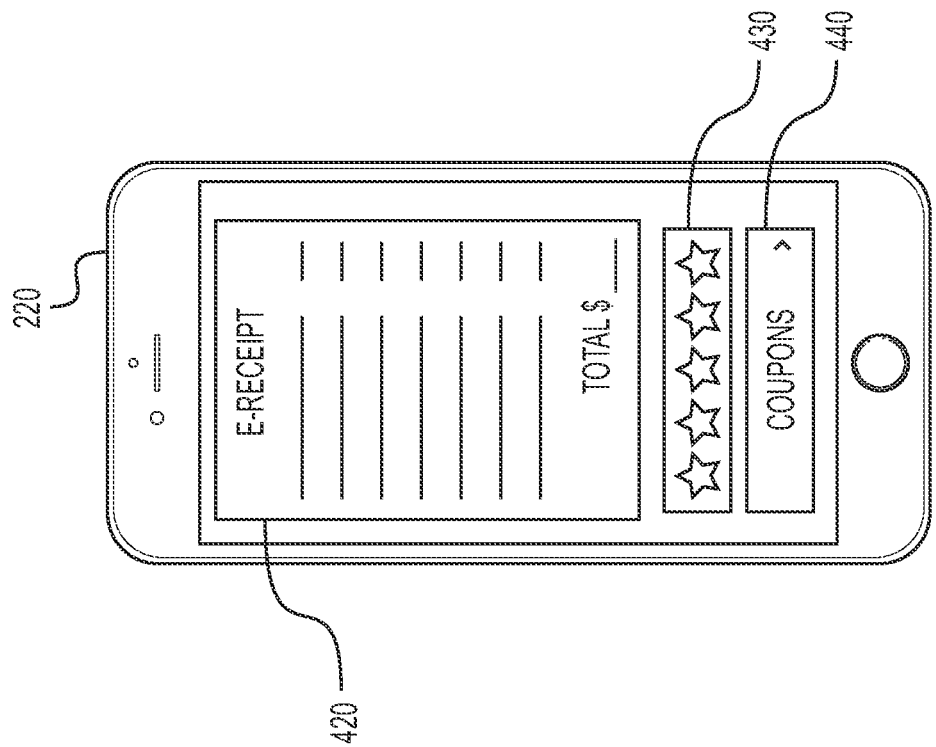
FIG. 4B depicts an illustrative display of an NFC-enabled payment vehicle and an e-receipt, according to one or more embodiments.
Figure 4A:
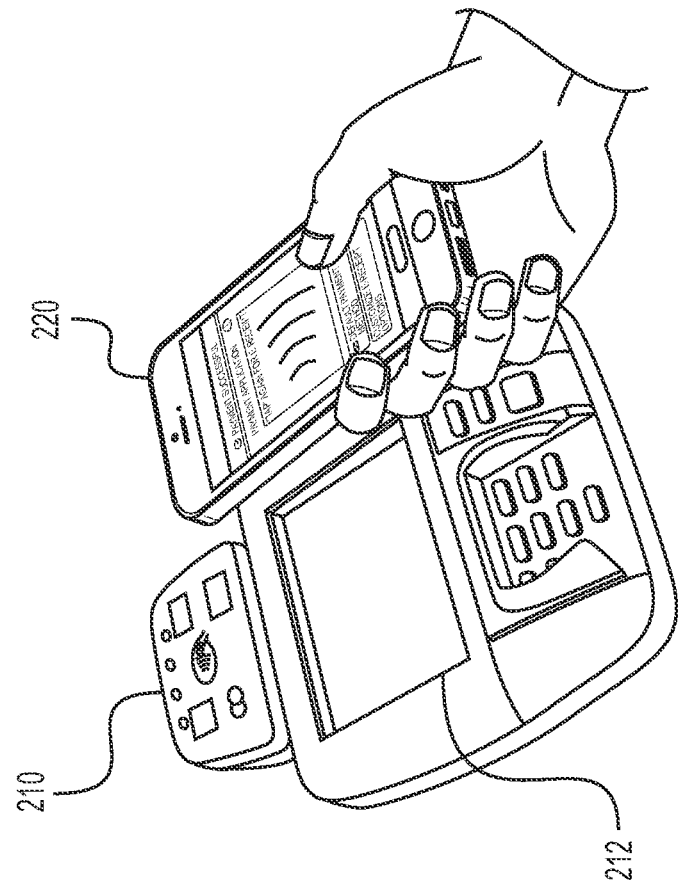
FIG. 4A depicts an NFC-enabled payment vehicle interacting with an NFC device after prompting to "tap" again for an e-receipt, according to one or more embodiments.

FIGS. 4A-4B illustrate embodiments of an example system and method for facilitating the generation of an e-receipt. FIG. 4A depicts a second interaction between the NFC-enabled payment vehicle 220 and NFC reader 210 during the check-out process. After payments environment 100 processes the payment transaction, consumer 102 is given the option to receive an e-receipt. Consumers are given the option to receive an e-receipt whether the purchase transaction is approved or declined. Consumer 102 is prompted to "tap" the NFC-enabled payment vehicle 220 a second time during the check-out process to retrieve an e-receipt. Indicator 250 in FIG. 2B provides an illustrative example of a prompt to "tap" again for an e-receipt. The prompt to "tap" again for an e-receipt can alternatively be displayed on display 212 of NFC reader 210, or on display area 122 of POS terminal 112.

FIG. 4B depicts an NFC-enabled payment vehicle 220 and an illustrative display of an e-receipt 420. E-receipt 420 is generated as a result of the second "tap" and is displayed on the NFC-enabled payment vehicle 220. In some embodiments, e-receipt 420 is displayed along with other customizable e-receipt features. Consumer 102 can customize additional e-receipt features by invoking selection area 260, as shown in FIG. 2B. While not illustrated in FIG. 4B, it can be appreciated that selection area 260 can also be configured to display along with e-receipt 420.

When invoking selection area 260, consumer 102 can enable or disable (not illustrated) any number of features to display when generating e-receipt 420. Selection areas 430 and 440 are non-limiting examples of customizable e-receipt features. Selection area 430, for instance, can be a ranking feature inviting consumer 102 to rate their customer experience at the time of the payment transaction. Selection area 440 can be an incentive feature that generates coupons or other loyalty rewards for the consumer. The customizable e-receipt options will be further described later with reference to FIGS. 6A-6B.

Figure 5:
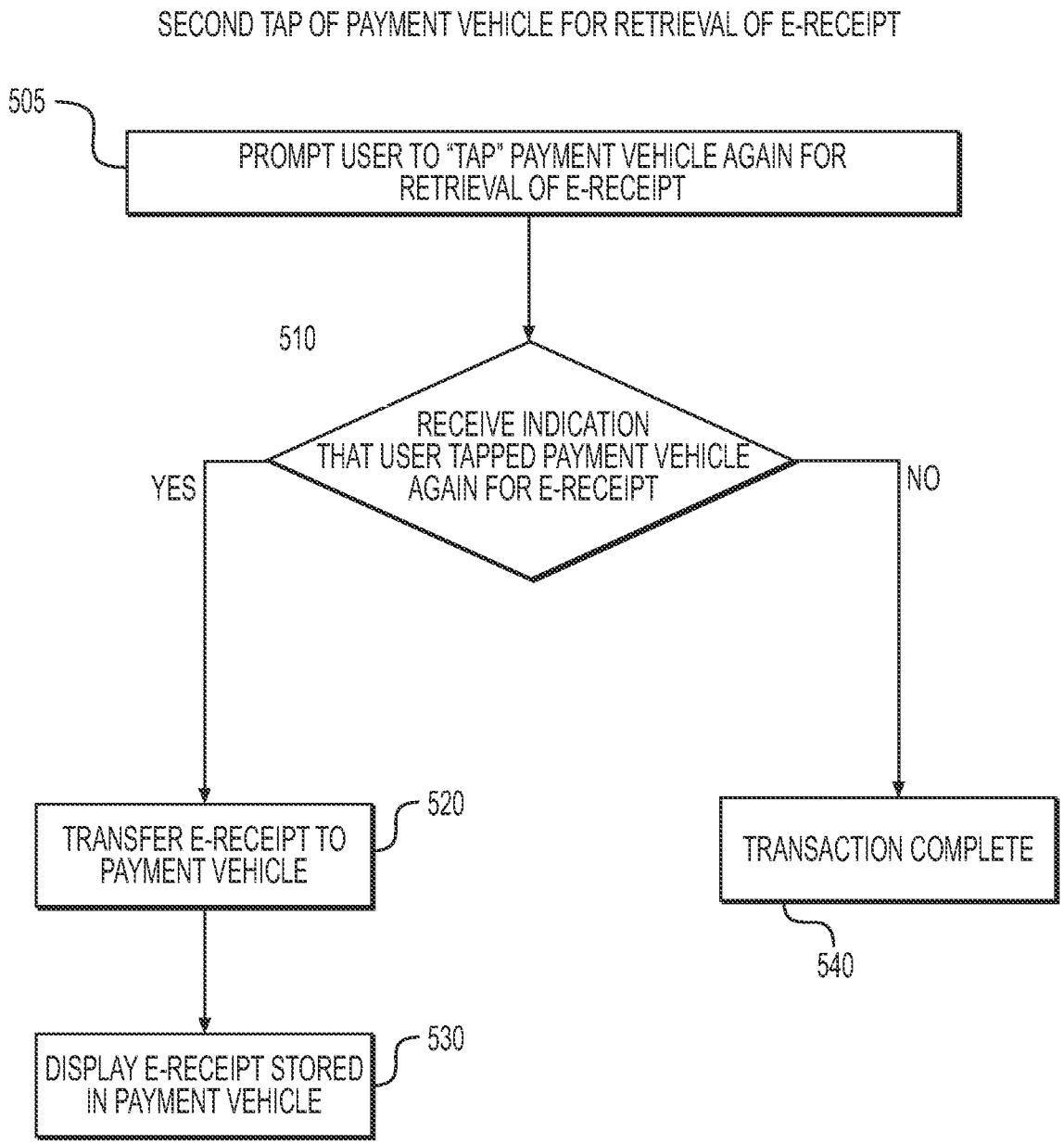
FIG. 5 is a flow chart depicting an example process for prompting a consumer to "tap" the NFC-enabled payment vehicle a second time for retrieval of an e-receipt, according to one or more embodiments.

FIG. 5 is a flow chart depicting an example process 500 for retrieving an e-receipt when finalizing a payment transaction. In step 505, consumer 102 is prompted to "tap" the NFC-enabled payment vehicle 220 a second time to receive an e-receipt. In some embodiments, the prompt to "tap" again is communicated via indicator 250 of the NFC-enabled payment vehicle 220, as shown in FIG. 2B. In other embodiments, the prompt to "tap" again is communicated via display area 122 of POS terminal 112 or via display 212 of NFC device 210. In step 510, POS terminal 112 determines whether NFC-enabled payment vehicle 220 interacts a second time with NFC device 210. If POS terminal 112 receives indication that the consumer "tapped" NFC-enabled payment vehicle 220 a second time, then the process proceeds to step 520. In step 520, an e-receipt 420 is generated and transferred to NFC-enabled payment vehicle 220. In some embodiments, e-receipt 420 is stored in a mobile wallet of NFC-enabled payment vehicle 220. In step 530, e-receipt 420 is displayed on the NFC-enabled payment vehicle 220 and the checkout process is finalized. At step 510, if POS terminal 112 does not receive indication that the consumer "tapped" the NFC-enabled payment vehicle 220 a second time, then the process proceeds to step 540. In step 540, the check-out process is finalized and the payment transaction is complete.

Figure 6A:
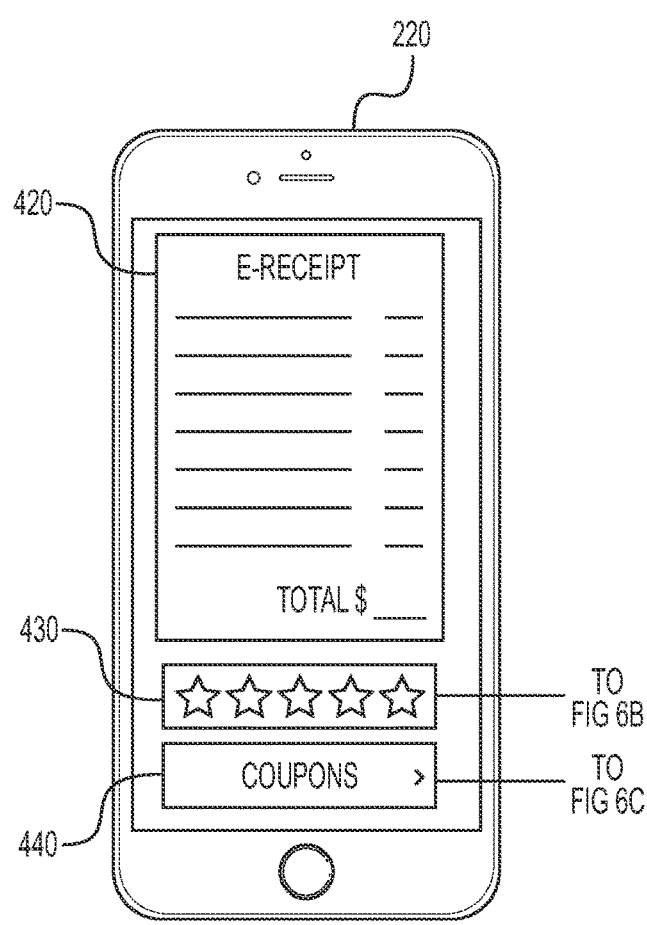
FIG. 6A depicts an NFC-enabled payment vehicle with an illustrative display of an e-receipt and customizable e-receipt features, according to one or more embodiments.
Figure 6B:
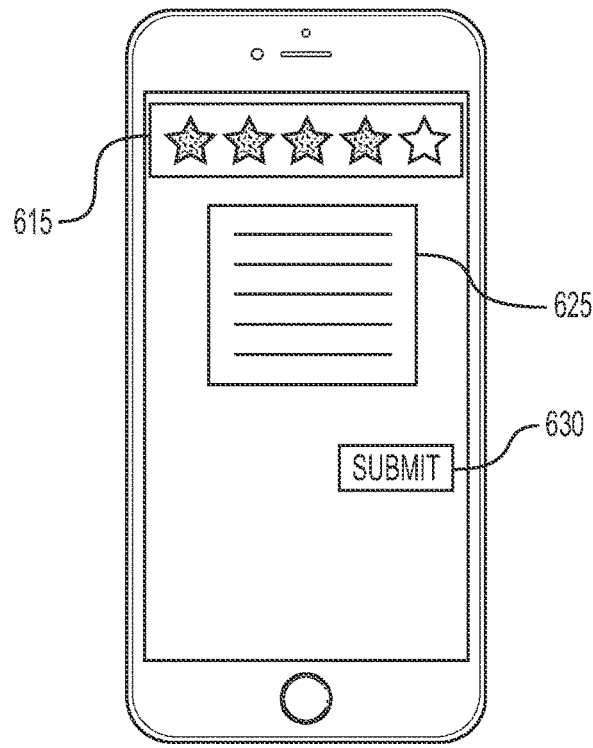
FIG. 6B depicts an NFC-enabled payment vehicle with an illustrative display of a customer experience rating feature, according to one or more embodiments.

FIGS. 6A-6B illustrate examples of customizable e-receipt features to display when generating an e-receipt during a check-out process. FIG. 6A depicts e-receipt 420 displayed along with customizable e-receipt features. Selection areas 430 and 440 are non-limiting examples of customizable features that can be generated to display along with e-receipt 420. Selection area 430, for instance, can be a ranking feature inviting consumer 102 to rate their customer experience at the time of purchase. Merchant 110 can incentivize consumer 102 to rate their customer experience in exchange for loyalty rewards (e.g., credits, discounts, points, etc.).

FIG. 6B is an illustrative example of consumer 102 rating their customer experience at the time of purchase. Indicator 615 displays the rating chosen by the consumer 102. Feedback field 625 provides an area for consumer 102 to input additional feedback for clarifying the consumer's experience. Submit field 630 can display an incentive feature, such as a loyalty reward (e.g., credits, discounts, points, etc.), for consumer 102 in exchange for submitting the rating and/or the customer experience feedback.

Figure 6C:
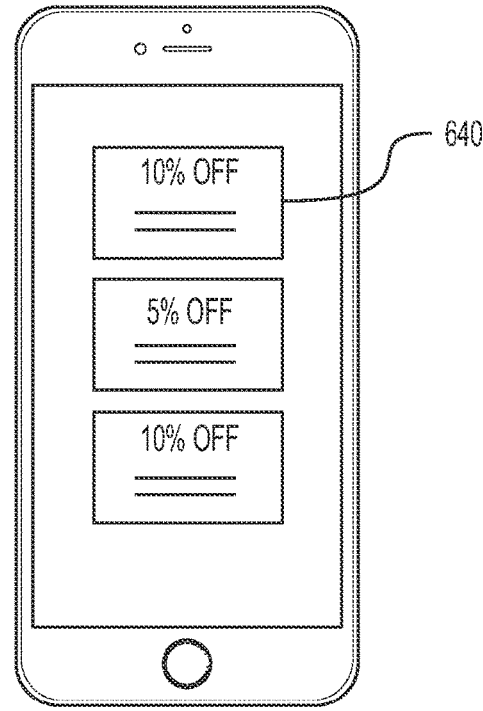
FIG. 6C depicts an NFC-enabled payment vehicle with an illustrative display of coupons generated for a consumer, according to one or more embodiments.

FIG. 6C depicts an illustrative display of coupons 640 that consumer 102 can redeem in future payment transactions. Coupons 640 are generated when invoking selection area 440. In some embodiments, coupons 640 can be generic and independent of the consumer's purchasing behavior. In other embodiments, coupons 640 can be tailored to reward the consumer's purchasing behavior and/or tailored to incentivize future purchasing behavior.

Figure 7:
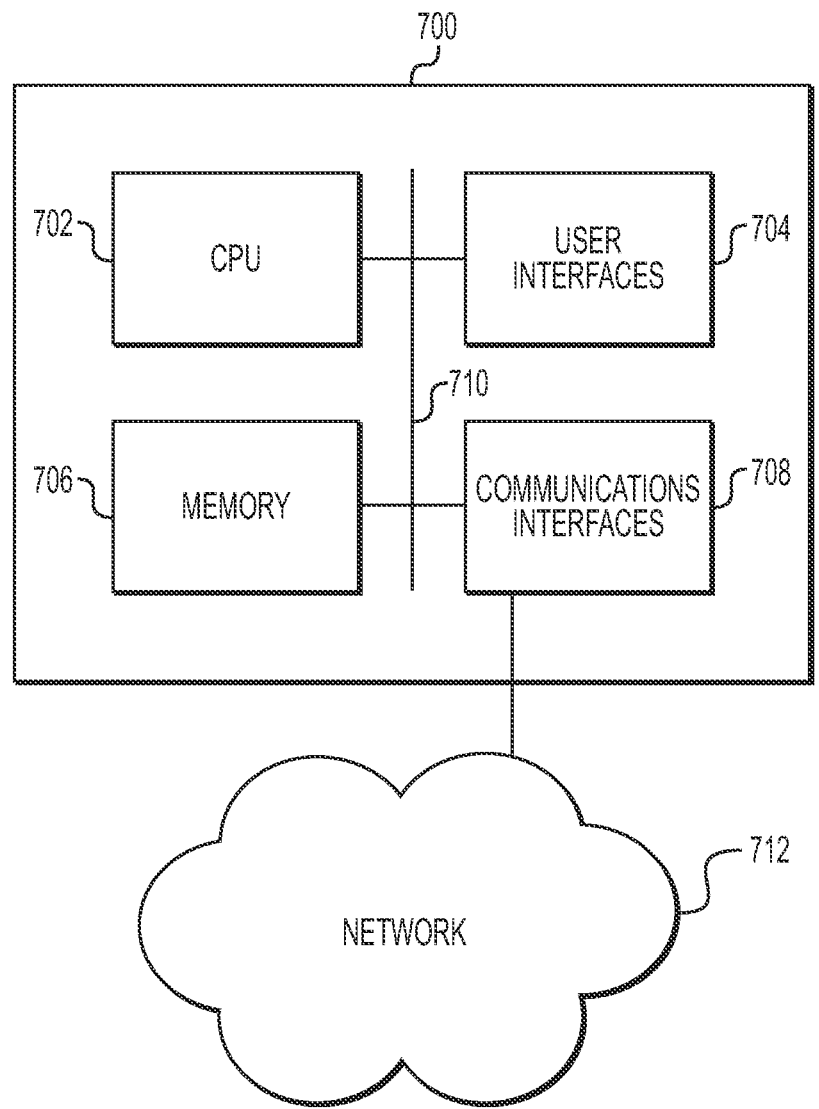
FIG. 7 is a block diagram of an example computing environment, according to one or more embodiments.

The systems and processes described above can be performed on or between one or more computing devices. FIG. 7 illustrates an example computing device. A computing device 700 can be a server, a computing device that is integrated with other systems or subsystems, a mobile computing device such as a smart phone, a cloud-based computing ability, and so forth. The computing device 700 can be any suitable computing device as would be understood in the art, including without limitation, a custom chip, and embedded processing device, a tablet computing device, a POS terminal 112 associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component can be replaced by multiple components and multiple components can be replaced by single component to perform a given function or functions. Except where such substitution would not be operative, such substitution is within the intended scope of the embodiments.

The computing device 700 includes a processor 702 that can be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources can also include distributed computing devices, cloud computing resources, and virtual computing resources in general.

The computing device 700 also includes one or more memories 706, for example read-only memory (ROM), random access memory (RAM), cache memory associated with the processor 702, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 700 also includes storage media such as a storage device that can be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 702, or memories 706 are also contemplated as storage devices. It can be appreciated that such memory can be internal or external with respect to operation of the disclosed embodiments. It can be appreciated that certain portions of the processes described herein can be performed using instructions stored on a computer readable medium or media that direct computer system to perform the process steps. Non-transitory computable-readable media, as used herein, comprises all computer-readable media except for transitory, propagating signals.

Networking communication interfaces 708 can be configured to transmit to, or receive data from, other computing devices 700 across a network 712. The network and communication interfaces 708 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 708 can include wire data transmission links such as Ethernet and TCP/IP. The communication interfaces 708 can include wireless protocols for interfacing with private or public networks 712. For example, the network and communication interfaces 708 and protocols can include interfaces for communicating with private wireless networks such as Wi-Fi network, one of the IEEE 802.11x family of networks, or another suitable wireless network. The network and communication interfaces 708 can include interfaces and protocols for communicating with public wireless networks 708, using for example wireless protocols used by cellular network providers, including Code Division Multiple Access (CDMA) and Global System for Mobile Communications (GSM). A computing device 700 can use network and communication interfaces 708 to communicate with hardware modules such as a database or data store, or one or more servers or other networked computing resources. Data can be encrypted or protected from unauthorized access.

In various configurations, the computing device 700 can include a system bus 710 for interconnecting the various components of the computing device 700, or the computing device 700 can be integrated into one or more chips such as programmable logic device or application specific integrated circuit (ASIC). The system bus 710 can include a memory controller, a local bus, or a peripheral bus for supporting input and output devices 704, and communication interfaces 708. Example input and output devices 704 include keyboards, keypads, gesture or graphical input devices, motion input devices, touchscreen interfaces, one or more displays, audio units, voice recognition units, vibratory devices, computer mice, and any other suitable user interface.

The processor 702 and memory 706 can include nonvolatile memory for storing computable-readable instructions, data, data structures, program modules, code, microcode, and other software components for storing the computer-readable instructions in non-transitory computable-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A computer-implemented method of managing electronic payment transactions at a merchant location, the method comprising:
   determining, by a point-of-sale (POS) terminal associated with a merchant, that a near field communication (NFC)-enabled payment vehicle interacted with the POS terminal;
   receiving, by the POS terminal, customer data from the NFC-enabled payment vehicle;
   processing, by the POS terminal, the payment transaction with the received customer data;
   generating, by the POS terminal, an e-receipt comprising one or more customizable features; and
   transmitting, by the POS terminal to the NFC-enabled payment vehicle, the e-receipt for display on the NFC-enabled payment vehicle.

2. The method of claim 1, wherein transmitting, by the POS terminal, the e-receipt to the NFC-enabled payment vehicle comprises transmitting, by the POS terminal, the e-receipt to be stored in a mobile wallet of the NFC-enabled payment vehicle; and
   wherein the displayed e-receipt comprises selection areas for the customer to enable the one or more customizable features.

3. The method of claim 1, wherein the one or more customizable features include at least one of: a ranking feature, a consumer incentive feature, an interactive coupon, or a loyalty reward.

4. The method of claim 1, further comprising:
receiving an indication that a selection area has been activated for the one or more customizable features; and
displaying the one or more customizable features associated with the selected selection area.

5. The method of claim 4, wherein the selection area allows a user to enable or disable the one or more customizable features.

6. The method of claim 1, further comprising:
upon the POS terminal receiving an indication that the payment transaction is approved, prompting, by the POS terminal, a payment transaction result to the customer by signaling via a display area of the POS terminal and/or via a display area of the NFC-enabled payment vehicle,
wherein prompting, by the POS terminal, the payment transaction result to the customer further comprises prompting, by the POS terminal, an interaction between the NFC-enabled payment vehicle and an NFC reader to generate the e-receipt for finalizing the payment transaction.

7. The method of claim 1, wherein the interaction with the POS terminal comprise a tap of the NFC-enabled payment vehicle against the POS terminal.

8. A system for managing electronic payment transactions at a merchant location, the system comprising:
a data storage device storing instructions; and
a processor configured to execute the instructions to perform operations comprising:
determining, by a point-of-sale (POS) terminal associated with a merchant, that a near field communication (NFC)-enabled payment vehicle interacted with the POS terminal;
receiving, by the POS terminal, customer data from the NFC-enabled payment vehicle;
processing, by the POS terminal, the payment transaction with the received customer data;
generating, by the POS terminal, an e-receipt comprising one or more customizable features; and
transmitting, by the POS terminal to the NFC-enabled payment vehicle, the e-receipt for display on the NFC-enabled payment vehicle.

9. The system of claim 8, wherein transmitting, by the POS terminal, the e-receipt to the NFC-enabled payment vehicle comprises transmitting, by the POS terminal, the e-receipt to be stored in a mobile wallet of the NFC-enabled payment vehicle; and
wherein the displayed e-receipt comprises selection areas for the customer to enable the one or more customizable features.

10. The system of claim 8, wherein the one or more customizable features include at least one of: a ranking feature, a consumer incentive feature, an interactive coupon, or a loyalty reward.

11. The system of claim 8, the operations further comprising:
receiving an indication that a selection area has been activated for the one or more customizable features; and
displaying the one or more customizable features associated with the selected selection area.

12. The system of claim 11, wherein the selection area allows a user to enable or disable the one or more customizable features.

13. The system of claim 8, the operations further comprising:
upon the POS terminal receiving an indication that the payment transaction is approved, prompting, by the POS terminal, a payment transaction result to the customer by signaling via a display area of the POS terminal and/or via a display area of the NFC-enabled payment vehicle,
wherein prompting, by the POS terminal, the payment transaction result to the customer further comprises prompting, by the POS terminal, an interaction between the NFC-enabled payment vehicle and an NFC reader to generate the e-receipt for finalizing the payment transaction.

14. The system of claim 8, wherein the interaction with the POS terminal comprises a tap of the NFC-enabled payment vehicle against the POS terminal.

15. A non-transitory computer readable medium storing computer-executable programming instructions which, when executed by at least one processor, cause the at least one processor to perform operations for managing electronic payment transactions at a merchant location, the operations comprising:
determining, by a point-of-sale (POS) terminal associated with a merchant, that a near field communication (NFC)-enabled payment vehicle interacted with the POS terminal;
receiving, by the POS terminal, customer data from the NFC-enabled payment vehicle;
processing, by the POS terminal, the payment transaction with the received customer data;
generating, by the POS terminal, an e-receipt comprising one or more customizable features; and
transmitting, by the POS terminal to the NFC-enabled payment vehicle, the e-receipt for display on the NFC-enabled payment vehicle.

16. The non-transitory computer readable medium of claim 15, wherein transmitting, by the POS terminal, the e-receipt to the NFC-enabled payment vehicle comprises transmitting, by the POS terminal, the e-receipt to be stored in a mobile wallet of the NFC-enabled payment vehicle; and
wherein the displayed e-receipt comprises selection areas for the customer to enable the one or more customizable features.

17. The non-transitory computer readable medium of claim 15, wherein the one or more customizable features include at least one of: a ranking feature, a consumer incentive feature, an interactive coupon, or a loyalty reward.

18. The non-transitory computer readable medium of claim 15, the operations further comprising:
receiving an indication that a selection area has been activated for the one or more customizable features; and
displaying the one or more customizable features associated with the selected selection area.

19. The non-transitory computer readable medium of claim 18, wherein the selection area allows a user to enable or disable the one or more customizable features.

20. The non-transitory computer readable medium of claim 15, the operations further comprising:
upon the POS terminal receiving an indication that the payment transaction is approved, prompting, by the POS terminal, a payment transaction result to the customer by signaling via a display area of the POS terminal and/or via a display area of the NFC-enabled payment vehicle, wherein prompting, by the POS terminal, the payment transaction result to the customer further comprises prompting, by the POS terminal, an interaction between the NFC-enabled payment vehicle and an NFC reader to generate the e-receipt for finalizing the payment transaction.

\* \* \* \* \*